United States Patent [19]

Tom et al.

[11] Patent Number: 4,950,419

[45] Date of Patent: Aug. 21, 1990

[54] PROCESS, COMPOSITION, AND APPARATUS FOR PURIFYING INERT GASES TO REMOVE LEWIS ACID AND OXIDANT IMPURITIES THEREFROM

[75] Inventors: Glenn M. Tom, New Milford; Duncan W. Brown, Wilton, both of Conn.

[73] Assignee: Advanced Technology Materials, Inc., New Milford, Conn.

[21] Appl. No.: 169,400

[22] Filed: Mar. 17, 1988

Related U.S. Application Data

[63] Continuation-in-part of Ser. No. 29,632, Mar. 24, 1987, Pat. No. 4,761,395.

[51] Int. Cl.$^5$ .......................... C10K 1/00; B01D 53/04
[52] U.S. Cl. .................................... 252/194; 252/190; 423/219; 423/230
[58] Field of Search ................ 252/192, 194; 423/244, 423/219, 230

[56] References Cited

U.S. PATENT DOCUMENTS

| 3,485,585 | 12/1969 | Snyder | 23/204 |
|---|---|---|---|
| 3,666,416 | 5/1972 | Henle et al. | 23/204 |
| 4,450,099 | 5/1984 | Lewis et al. | 502/232 |
| 4,603,148 | 7/1986 | Tom | 521/31 |
| 4,604,270 | 8/1986 | Tom | |
| 4,659,552 | 4/1987 | Tom | 423/219 |
| 4,761,395 | 8/1988 | Tom et al. | 252/194 |
| 7,029,632 | 3/1987 | Tom et al. | |

OTHER PUBLICATIONS

Tom, G. M., "Removal of Trace Impurities From Critical Process Gases," Millipore Fourth Annual Microelectronics technical Symposium.
Gordon, A. J., "The Chemist's Campanion", John Wiley & Sons, pp. 62-63 (1972).
Hercules Incorporated, "Metal Hydride Scavengers for the Removal of Impurities From Aprotic Fluids," Research Disclosure No. 276105 Apr. 1987.
Rhodes, H. L., "An Apparatus and Procedure for Calibrating A Water Vapor Analyzer in The 0.1 to 15 PPM Range," Report of Investigations No. 8548, U.S. Dept. of the Interior (1981).
Smyrl, N. R. et al, "Monitoring The Heterogenous Reaction of LiH and LiOH With $H_2O$ and $CO_2$ By Diffused Reflectance Infrared Fourier Transform Spectroscopy," Applied Spectroscopy, vol. 37, pp. 38-44 (1983).
Ashby, E. C., et al, "Magnesium Dihydride," *Inorganic Synthesis*, pp. 2-5.
Hurd, D. T., "Chemistry of the Hydrides," John Wiley & Sons, New York, pp. 51-52 (1952).

Primary Examiner—John S. Maples
Assistant Examiner—Valerie D. Fee
Attorney, Agent, or Firm—Steven J. Hultquist

[57] ABSTRACT

A scavenger for purifying inert gas mixtures to remove Lewis acid and oxidant impurities therefrom, comprising (i) an inert inorganic support, and (ii) an active scavenging species on the support, formed by deposition thereon of an organometallic precursor and pyrolysis thereof at a selected elevated temperature. The organometallic precursor is an alkyl metal compound comprising a metal of Group IA, IIA, and/or IIIA, wherein the pyrolysis temperature may range from about 150° C. to about 250° C., depending on the specific alkyl metal compound employed as the precursor. Also disclosed are: a corresponding method of making the scavenger; a process for purifying inert gases by contacting same with the scavenger; and a vessel containing a bed of the scavenger, useful as an apparatus for purifying inert gases.

16 Claims, 1 Drawing Sheet

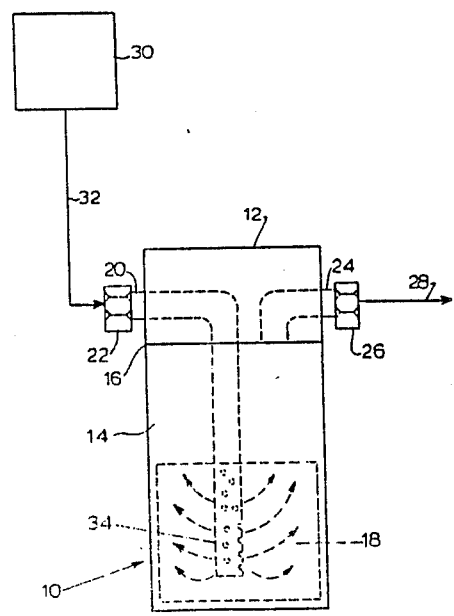

PROCESS, COMPOSITION, AND APPARATUS FOR PURIFYING INERT GASES TO REMOVE LEWIS ACID AND OXIDANT IMPURITIES THEREFROM

CROSS-REFERENCE TO RELATED APPLICATION

This is a continuation-in-part of U.S. Ser. No. 29,632 filed Mar. 24, 1987 and issued Aug. 2, 1988 as U.S. Pat. No. 4,761,395.

BACKGROUND OF THE INVENTION

1. Field of the Invention

This invention generally relates to a composition, process, and apparatus for purifying inert gas mixtures to remove Lewis acid and oxidant impurities therefrom.

2. Description of the Related Art

The provision of high purity inert gas streams is critically important in a wide variety of industrial and research applications.

An example of such applications is the fabrication of semiconductor devices. A number of inert gases are employed in such fabrication, and these gases as supplied frequently are contaminated with impurities such as Lewis acids and/or oxidants, e.g., oxygen and/or water. Such impurities when present in any significant amounts can render the product semiconductor device deficient or even useless for its intended purpose.

Accordingly, there is a continuing need in the art to develop and deploy improved apparatus, processes, and materials for purifying inert gas streams of such impurities.

The formation of scavengers suitable for purifying aprotic fluids such as aliphatic hydrocarbons, olefins, and gases used in the semiconductor industry, by pyrolyzing Group I metal alkyls on an inorganic support to convert the metal alkyls to their corresponding metal hydrides, is disclosed in "Metal Hydride Scavengers for the Removal of Impurities from Aprotic Fluids," Research Disclosure No. 276105, of Hercules Incorporated, April, 1987. A criterion for the use of such scavengers is that the fluid to be purified be inert to the scavenger. The capacity disclosed for this scavenger, in terms of oxygen impurity removal capacity, is two liters of oxygen per liter of a bed of such scavenger.

U.S. Pat. Nos. 4,604,270 and 4,603,148 to G. M. Tom disclose scavengers in which alkyl metal compounds are immobilized by coupling them to an organic polymeric support, followed by pyrolysis to yield a dispersed phase of the metal hydride in the organic polymer matrix.

Our U.S. Pat. No. 4,761,395 issued Aug. 2, 1988 and entitled "Process and Composition for Purifying Arsine, Phosphine, Ammonia, and Inert Gases to Remove Lewis Acid and Oxidant Impurities Therefrom," discloses scavenger compositions comprising a support having associated therewith, but not covalently bound thereto, an anion which is reactive with impurities in the gas mixture to remove same. The anion may be a carbanion whose corresponding protonated compound has a $pK_a$ value of from about 22 to about 36, and/or anions formed by reaction of such carbanions with the primary component of the gas mixture, i.e., carbanions that selectively deprotonate the primary component of the gas mixture, such as arsine, phosphine, or ammonia, to form the corresponding arside, phosphide, or amide anion as the active scavenging species. An illustrative scavenging source compound loaded on the support to form such prior art scavengers is triphenylmethyllithium, which provides a triphenylmethide anion as an active scavenging moiety.

H. L. Rhodes, "An Apparatus and Procedure for Calibrating a Water Vapor Analyzer in the 0.1 to 15 ppm Range," Report of Investigations No. 8548, U.S. Department of the Interior, Bureau of Mines (1981), describes a method of detecting small amounts of water in a gas, wherein bulk powdered calcium hydride is reacted with the water vapor at 150° C. to form hydrogen gas, which then is analyzed by gas chromomatography to determine the original water content of the gas containing same.

The absorption of water and carbon dioxide on bulk lithium hydride is reported in Smyrl, M. R., et al, "Monitoring the Heterogeneous Reaction of LiH and LiOH with $H_2O$ and $CO_2$ by Diffuse Reflectance Infrared Fourier Transform Spectroscopy," *Applied Spectroscopy*, 37, pp. 38-44 (1983).

U.S. Pat. No. 2,919,268 to P. Fotis, Jr., et al discloses a composition formed by heating a Group IIa metal and a metal oxide at a 0.15-1.0 weight ratio and a temperature of 500°-700° C., to form a catalyst said to be useful in the polymerization of normal alkenes.

U.S. Pat. No. 4,450,099 discloses a synthesis gas catalyst formed by slurrying barium hydroxide with a metal oxide such as barium oxide, alumina, and silica, followed by calcining of the resulting solids at 200°-900° C.

It is an object of the present invention to provide an improved scavenger for purification of inert gases to remove Lewis acid and oxidant impurities therefrom.

It is another object of the present invention to provide an improved scavenger of such type, which is characterized by high scavenging capacity, e.g., in terms of water and oxygen removal capacity.

It is still another object of the invention to provide a scavenger of the aforementioned type, which is readily formed at comparatively low temperatures. It is a further object of the present invention to provide a method of making the aforementioned catalyst, and a process and apparatus for utilizing same to purify inert gas mixtures, to remove Lewis acid and oxidant impurities therefrom. Other objects and advantages will be more fully apparent from the ensuing disclosure and appended claims.

SUMMARY OF THE INVENTION

In one aspect, the present invention relates to a scavenger having utility for purifying inert gas mixtures to remove Lewis acids and oxidant impurities therefrom, such scavenger comprising:

(a) an inert inorganic support having a surface area in the range of from about 30 to about 1000 square meters per gram, and thermally stable up to at least about 300° C.; and (b) an active scavenging species, present on the support at a concentration of from about 1 mole to about 5 moles per liter of support, and formed by deposition on the support of an organometallic precursor and pyrolysis thereof at a selected elevated temperature on said support, the organo-metallic precursor and the selected elevated temperature being selected from those of the group consisting of:

(i) the organometallic precursor being an organo-metal compound of the formula MR, wherein M is a metal from Group IA and R is alkyl, and the selected elevated temperature being in the range of from about 150° C. to about 210° C.;

(ii) the organometallic precursor being an organometal compound of the formula $M(R)_2$, wherein M is a metal from Group IIA and R is alkyl, and the selected elevated temperature being in the range from about 150° C. to about 210° C.; and (iii) the organometallic precursor being an organometal compound of the formula $M(R)_3$, wherein M is a metal from Group IIIA and R is alkyl, and the selected elevated temperature being in the range of from about 150° to about 250° C.

In another aspect, the present invention relates to a method of making a scavenger having utility for purifying inert gas mixtures to remove Lewis acids and oxidant impurities therefrom, comprising the steps of:

(a) providing an inert inorganic support having a surface area in the range of from about 30 to about 1000 square meters per gram, and thermally stable up to at least about 300° C.;

(b) depositing on such inorganic support, at a concentration from about 1 mole/liter to about 5 moles/liter of support, an organometallic precursor selected from the group consisting of:

(i) an organometal compound of the formula MR, wherein M is a metal from Group IA and R is alkyl;

(ii) an organometal compound of the formula $M(R)_2$, wherein M is a metal from Group IIA and R is alkyl; and (iii) an organometal compound of the formula $M(R)_3$, wherein M is a metal from Group IIIA and R is alkyl; and (c) pyrolyzing the organometallic precursor on the support, at a temperature of from about 150° C. to about 210° C. for organometallic precursors (b)(i) and (b)(ii), and from about 150° C. to about 250° C. for organometallic precursor (b)(iii).

A further aspect of the invention relates to a process for purifying inert gas mixtures to remove Lewis acid and oxidant impurities therefrom, comprising contacting the impurity-containing inert gas mixture with a scavenger of the general type described above.

A still further aspect of the invention relates to an apparatus for purifying inert gas mixtures to remove Lewis acid and oxidant impurities therefrom, comprising:

(a) a vessel containing a bed of a scavenger, the scavenger comprising:

(i) an inert inorganic support having a surface area in the range of from about 30 to about 1000 square meters per gram, and thermally stable up to at least about 300° C.; and (ii) an active scavenging species, present on the support at a concentration of from about 1 mole per liter to about 5 moles per liter of support, and formed by deposition on the support of an organometallic precursor and pyrolysis thereof at a selected elevated temperature on the support, the organometallic precursor and the selected elevated temperature being selected from those of the group consisting of:

(A) the organometallic precursor being an organometal compound of the formula MR, wherein M is a metal from Group IA and R is alkyl, and the selected elevated temperature being in the range of from about 150° C. to about 210° C.;

(B) the organometallic precursor being an organometal compound of the formula $M(R)_2$, wherein M is a metal from Group IIA and R is alkyl, and the selected elevated temperature being in the range from about 150° C. to about 210° C.; and (C) the organometallic precursor being an organometal compound of the formula $M(R)_3$, wherein M is a metal from Group IIIA and R is alkyl, and the selected elevated temperature being in the range of from about 150° to about 250° C.;

(b) means for introducing impurity-containing inert gas to the vessel; and (c) means for discharging impurity-depleted inert gas from the vessel.

Other aspects and features of the invention will be more fully apparent from the ensuing disclosure and appended claims.

BRIEF DESCRIPTION OF THE DRAWING

The single drawing is a partially-sectioned, elevation view of an inert gas mixture purification apparatus, according to one embodiment of the present invention.

DETAILED DESCRIPTION OF THE INVENTION, AND PREFERRED EMBODIMENTS THEREOF

The present invention is based on the surprising and unexpected discovery of scavenger compositions for purifying inert gas mixtures to remove Lewis acid and oxidant impurities therefrom, which exhibit extremely high Lewis acid and oxidant impurity-removal capacity, as compared to various scavenger and gas sorption compositions of the prior art described in the "Background of the Invention" section hereof.

As used herein, the term "inert gases" refers to gases that are substantially non-reactive with the active scavenging moieties of scavengers according to the present invention. The term "inert gas mixtures" refers to mixtures of inert gases with Lewis acid and/or oxidant impurities.

The inert gases to which the scavengers of the present invention are potentially usefully applied, may for example include nitrogen, hydrogen, helium, argon, neon, hydrocarbons, ammonia, silane, and germane. The hydrocarbons with which the scavengers of the present invention may be usefully employed include methane, ethane, ethylene, propylene, and the like.

The scavengers of the present invention are particularly usefully employed in removing oxygen and water from inert gases employed in the fabrication of semiconductor devices, however, the broad utility of such scavengers is not thus limited, and the same may be employed in any inert gas purification application where highly efficient removal of Lewis acid and oxidant impurities is desired.

The scavengers of the present invention comprise an inert inorganic support having a surface area in the range of from about 30 to about 1000 square meters per gram, and thermally stable up to at least about 300° C.

As used in this context, the term "inert" means that the support is non-reactive to the Lewis acid and oxidant impurities which are reactively removed by the active scavenging species present on the support, and that the support is also non-reactive with the inert gases being purified by the scavenger.

Supports employed in scavengers of the present invention are formed of materials characterized by thermal and chemical stability, as well as high porosity.

The stability criteria are important for maintaining the integrity of the scavenger during the pyrolysis phase of the scavenger preparation, and in the presence of the reagents employed to form the active scavenging species on the support, and the inert gas mixtures to be purified.

Specifically, the support materials should be thermally stable up to at least about 300° C., to accommodate the maximum temperatures encountered in synthesis and use of the scavenger, typically in the range of from about 200° C. to about 300° C. The reagents which are suitably employed to form the the active scavenging species on the support are characteristically strongly reducing and basic in nature.

High porosity of the support material is essential to the high capacity scavenger of the invention. For such high capacity scavengers, the support material suitably has a surface area, as determined by standard nitrogen BET determination, of from about 30 to about 1000 square meters per gram.

Illustrative materials which may be potentially useful in the broad practice of the invention include materials such as aluminosilicates, alumina, silica, kieselguhr, and carbon, and mixtures, alloys, and composites thereof.

As used herein, the term "aluminosilicates" means a support composition including the elements aluminum, silicon, and oxygen, such as molecular sieves; such aluminosilicates may be natural or synthetic in character.

The supports useful in the scavengers of the present invention thus include any suitable materials which are compatible with the inert gas mixtures being purified, and the reaction products of the impurity removal, and any intermediates involved in preparing the scavenger, and which are stable under the conditions of use.

The preferred characteristics of supports which are useful for scavengers of the invention include (a) high surface area, for example a surface area in the range of from about 30 to about 1000 square meters per gram of support, (b) high porosity, such as a significant porosity from pores of a diameter in the range of from about 3 to about 200 Angstroms, and (c) good thermal stability, e.g., thermally stable at temperatures up to at least about 300 degrees Centigrade.

The scavengers of the invention may be readily formed into a bed through which the impurity-containing inert gas mixture is flowed for purification thereof, thereby providing a highly efficient removal system for substantially eliminating Lewis acid and oxidant impurities, such as water and oxygen impurities, from inert gases.

Suitable scavengers according to the invention, utilizing metal and hydridic active scavenging species derived by pyrolysis of alkyl metal compounds of Group IA-IIIA metals on suitable supports, may variously provide water and/or oxygen removal capacity of from about 10 to about 30 liters of gaseous water and/or oxygen per liter of bed of the scavenger. In some instances where the impurity-removing reactions are highly exothermic in character, it may be desirable to utilize a lower removal capacity, e.g., of from about 5 to about 10 liters of gaseous water and/or oxygen per liter of bed of the scavenger.

The impurity removal capacity of the bed may of course be readily adjusted to a particular desired level by controlling the loading of the active scavenging species on the suppport in the impregnation or other fabrication step by which the organometallic precursor compound is applied to the support.

The single drawing hereof shows a schematic representation of an apparatus for carrying out the inert gas purification method of the invention.

The vessel 10 comprises an upper cylindrically shaped block 12 joined to the cup-like receptacle 14 by means of circumferentially extending weld 16. In the lower portion of receptacle 14 is disposed a bed 18 of the scavenger according to the present invention.

The vessel features means for introducing the impurity-containing gas mixture, comprising as a primary component one or more inert gases, into the interior space of the receptacle 14 for contact with the scavenger in bed 18. Such introduction means comprise the conduit 20, provided at its exterior end with an appropriate fitting 22 for joining with the supply line 32 to inert gas mixture source 30. The conduit 20 passes through the block 12 as shown, in a generally horizontal direction toward the center of the block and then downwardly extending from the block into the bed 18. At its lower portion in contact with the bed, this conduit has a plurality of gas distribution openings 34, through which the gas mixture flows outwardly and upwardly through the scavenger in the bed.

Above the bed in the receptacle 14, the impurity-depleted inert gas flows into the outlet conduit 24, provided with a suitable fitting 26 for connection to the product gas discharge line 28, from which the purified gas may be supplied to a downstream end-use processing facility.

In forming the scavengers of the invention, the inert support is allowed to react with an organometallic reagent, resulting in deposition on the support of an organometallic precursor of the active scavenging species. The organometallic precursor thus immobilized on the support is pyrolyzed in situ to yield a non-volatile pyrolysis product as the active scavenging species. The pyrolysis product generally comprises metal and/or metal hydride species, which must be capable of removing Lewis acid and/or oxidant impurities, e.g., water and/or oxygen, from an inert gas mixture containing such impurities, by converting the impurities to non-volatile species which do not leave the support bed, and which have low vapor pressure, so that the scavenger-contacted gas is substantially depleted in the impurity species.

The organometallic precursors which are employed to form the active scavenging species of the scavengers of the present invention, are alkyl metal compounds which on in situ pyrolysis yield active metals and/or hydride components on the inert support.

Useful alkyl metal compounds suitable for forming the active scavenging species of the scavenger suitably comprise a metal moiety which may be selected from one or more of Group IA, IIA, and IIIA metals. The metal constituents of the organometallic precursors may thus include lithium, sodium, potassium, magnesium, barium, calcium, and aluminum.

Alkyl metal compounds comprising metals of Groups IA, IIA, and/or IIIA are decomposable to yield metal hydrides and/or active metals at comparatively low temperatures by beta-hydride elimination. An example is the decomposition of dibutylmagnesium to form butene and magnesium hydride.

In the case of alkyl compounds of Group III metals such as aluminum, the pyrolysis of the alkyl substitutents will yield aluminum trihydride (alane) and/or a highly dispersed aluminum metal phase. Both of these decomposition product species are active scavengers useful to remove water and oxygen in an inert gas stream.

A highly preferred active scavenging species is formed by pyrolysis of dibutylmagnesium, since this reaction yields two equivalents of scavenging compounds, an olefin (butene) and the dihydride of the metal. By contrast, only one equivalent of scavenging moiety is formed upon decomposition of the Group I metal alkyl compounds.

The preferred scavenging species, magnesium dihydride, has a very favorable reaction equilibrium for scavenging removal of water and oxygen. The equilibrium constant for the reaction of magnesium dihydride with water to form magnesium hydroxide and hydrogen is $10^{22}$. Thus, there will be less than one part-per-billion (ppb) water in an inert gas stream that has been contacted and equilibrated with a scavenger comprising magnesium dihydride as the active scavenging species.

The reaction between oxygen and magnesium dihydride to form magesium hydroxide has an equilibrium constant of $10^{40}$, so that the concentration of oxygen in an inert gas stream that has been contacted and equilibrated with the scavenger will be less than 1 ppb.

Where, as in the case of dibutylmagnesium, the pyrolysis decomposition reaction yields a hydrocarbon, e.g., butene, it is necessary to eliminate the hydrocarbon by-product from the scavenger. Otherwise, contamination of the inert gas stream may occur in use of the scavenger, resulting from a spontaneous thermal beta-hydride process, or by a protonation of the alkyl metal complex which may release hydrocarbon into the gas stream, such as by the reaction:

$$Bu_2Mg + 2H_2O \rightarrow BuH + Mg(OH)_2.$$

As defined and discussed hereinearlier, inert gases do not significantly react with the scavenger. Such inert or non-reactive character can be quantified in terms of the $pK_a$ values of the gas species sought to be purified. Listed below in Table I are $pK_a$ values for illustrative gases.

TABLE I

| $pK_a$ Values for Selected Illustrative Compounds | |
|---|---|
| Compound | $pK_a$ |
| Butane | 42 |
| Methane | 40 |
| Hydrogen | 37 |
| Benzene | 37 |
| Ethylene | 36 |
| Propylene | 36 |
| Toluene | 35 |
| Phosphine | 28 |
| Arsine | 26 |
| Water | 15 |

For example, arsine will react with magnesium dihydride as the active scavenging species in accordance with the following reaction:

$$AsH_3 + MgH_2 \rightarrow HMgAsH_2 + H_2$$

For an illustrative scavenger comprising magnesium dihydride as the active scavenging species, ammonia will react with the scavenger, but only by physical adsorption and solvation effects. Accordingly, ammonia is inert to such scavenger, but arsine, reacting with the active scavenging species according to the above reaction, is a reactive, i.e., non-inert, gas.

Gases such as hydrogen, methane, and silane are likewise inert to the aforementioned illustrative scavenger comprising magnesium dihydride as the active scavenging species.

Among the various alkyl metal precursor compounds utilized to form the active scavenging species by pyrolysis, the preferred alkyl metal precursor compound for Group IA metals is butyllithium. The preferred alkyl metal precursor compound for Group IIA metals is dibutylmagnesium. The preferred alkyl metal precursor compounds for Group IIIA metals include trimethylaluminum, triethylaluminum, and/or diisobutylaluminum hydride.

As indicated, the scavengers of the present invention are characterized by removal capacities for Lewis acid and oxidant impurities which may be substantially greater than those of scavengers heretofore employed in the art. For example the water scavenging capacities of scavengers according to the present invention may be on the order of from about 20 to about 30 liters of gaseous water per liter of a bed of the scavenger. Oxygen scavenging capacities for scavengers according to the present invention may be on the order of from about 15 to about 30 liters of gaseous oxygen per liter of a bed of the scavenger. Alkyl metal compounds utilized as precursors to form the active scavenging species of scavengers of the invention, may suitably comprise as alkyl substituents $C_1$–$C_{12}$ alkyl, preferably $C_1$–$C_8$ alkyl, and most preferably $C_1$–$C_4$ alkyl.

The alkyl metal precursor compound may be deposited on the support in any suitable manner. Generally it has been found satisfactory to apply the organometallic precursor compound to the support from an organic solvent solution of the alkyl metal compound, followed by drying of the impregnated support, preferably at elevated temperature.

After the solvent has been driven off, the impregnated support may be subjected to elevated temperatures for pyrolysis of the alkyl metal compound. The specific elevated temperatures which may suitably be employed to carry out such pyrolysis may readily be determined by those skilled in the art via a few simple tests at varying temperatures, to determine temperature conditions appropriate to produce the desired active scavenger species from the particular alkyl metal compound being employed. In general, however, it is desirable to utilize a pyrolysis temperatures in the range of of from about 150° C. to about 210° C. for Group I and Group II metal compounds, and temperatures of from about 150° C. to about 250° C. for Group III metal compounds.

In like manner, the concentration of active scavenging species on the support, as effective to produce the desired purification of inert gases in a given end use application, may be readily determined by a few simple tests, without the necessity of undue experimentation. Generally, however, satisfactory results may be obtained by depositing on the support from about 1 to about 5 moles of the organo-metallic precursor per liter of support, to form a corresponding concentration of the active scavenging species on the support.

It will therefore be recognized that the specific concentration of active scavenging species which may be usefully employed on the scavenger of the present invention may be varied widely, depending on the type and concentration of the impurities in the inert gas stream to be purified, the intended service life of the scavenger, the volumetric flow rate of the inert gas mixture contacted with the specific scavenger, the flow regime of the gas stream contacted with the scavenger, the nature of the support, and the specific active scavenging species employed.

A basic requirement of the scavenger in the practice of the invention is that the vapor pressures of the scavenger and the reaction products of the impurity-scavenging reaction(s) be very low, preferably below about 1 ppm by volume, and most preferably below about 0.1 ppm by volume, to insure that the gas stream being purified is not contaminated by the scavenger or scavenging reaction products. This vapor pressure criterion is particularly important in the case of hydrocarbons, except of course in the case where gaseous hydrocarbons are the primary component of the inert gas mixture being purified.

The features and advantages of the present invention are further shown with respect to the following non-limiting examples, wherein all parts and precentages are by weight, unless otherwise expressly stated.

EXAMPLE I

A 200 ml sample of $Al_2O_3$ (Aldrich Chemical Co., Brockman Activity I neutral, 150 mesh) was dried at 350° C. for 48 hours under a stream of $N_2$, and then cooled under a stream of $N_2$. Approximately 200 ml of a 1.6 M solution of BuLi in hexane was added. The hexane was driven off from the material at 110° C. under a stream of $N_2$. The resulting alkyl metal-bonded support was heated to 210° C. for an additional 12 hours under a stream of $N_2$, to form a product solid having a pale yellow color.

EXAMPLE II

A 1000 ml sample of $Al_2O_3$ (Aldrich Chemical Co., Brockman Activity I netural, 150 mesh) was heated under a $N_2$ stream in a round bottom flask sealed with a rubber septum, and maintained at 350° C. for 4 days, following which it was cooled under a stream of $N_2$. The sample then was transferred into a N2 atmosphere glove box (VAC). A 400 ml aliquot of this material was placed in a Wheaton bottle equipped with a butyl rubber septum. 237 g of 3 wt % Mg solution of $Bu_2Mg$ in hexane was added to the $Al_2O_3$ support material, and the hexane was removed under a stream of $N_2$ at 100° C. After the removal of hexane was complete, the temperature of the material was raised to 210° C. to effect the beta-hydride loss of butene.

The resultant pale yellow solid was cooled and transferred into a $N_2$ atmosphere glove box.

EXAMPLE III

A 200 ml sample of dried $Al_2O_3$ (Aldrich Chemical Co., Brockman activity I neutral, 150 mesh) was prepared for loading with an alkyl metal compound according to the procedure of Example II, and approximately 50 ml of a 1.6M solution of BuLi in hexane was then added. The hexane was driven off from the material at 110° C. under a stream of $N_2$. The material finally was heated to 210° C. for an additional 12 hours under a stream of $N_2$ to form a pale yellow solid as the product.

EXAMPLE IV

A 30 sample of the material from Example I was placed in a container equipped with a septum. 1000 ppm $O_2$ was flowed through this bed of material at a flow rate was 50 ml per minute. The effluent gas was measured on a Delta F trace $O_2$ analyzer. The effluent gas had no $O_2$ therein (<50 ppb $O_2$) until breakthrough, at which time the effluent $O_2$ concentration rose sharply. The capacity of the scavenger bed was calculated from the amount of gas required to consume the bed and the volume of the bed of the scavenger material, as approximately 18 liters of $O_2$ per liter of bed.

EXAMPLE V

A 30 sample of the material from Example III was placed in a container equipped with a septum. 1000 ppm $O_2$ was passed this bed of material at a flow rate of 50 ml per minute. The effluent was measured on a Delta F trace $O_2$ analyzer. The effluent had no $O_2$ in the stream (<50 ppb $O_2$) until breakthrough. The capacity of the bed was calculated from the amount of gas required to consume the bed and the volume of the bed of the scavenger material, as approximately 3.6 liters of $O_2$ per liter of bed.

EXAMPLE VI

A 30 sample of the material from Example II was placed in a container equipped with a septum. 1000 ppm $O_2$ was passed through this bed of material at a flow rate of 50 ml per minute. The effluent was measured on a Delta F trace $O_2$ analyzer. The effluent had no $O_2$ (<50 ppb $O_2$) in the stream until breakthrough, when the effluent $O_2$ concentration rose sharply. The capacity of the bed was calculated from the amount of gas required to consume the bed and the volume of the bed of the scavenger material, as approximately 17 liters of $O_2$ per liter of bed.

EXAMPLE VII

A 30 ml of sample of the material from Example I was placed in a tube equipped with a septum, and a stream of high purity helium was passed through the sample. The helium effluent stream was introduced into a gas chromatograph that was senstive to 0.1 ppm $C_4$ hydrocarbons. No $C_4$ hydrocarbons were observed at a space velocity of 100 volumes of gas per volume of bed per hour.

EXAMPLE VIII

A 30 ml sample of the material from Example II was placed in a tube equipped with a septum, and a stream of high purity helium was passed through the sample. The helium effluent stream was introduced into a gas chromatograph that was sensitive to 0.1 ppm $C_4$ hydrocarbons. No $C_4$ hydrocarbons were observed at a space velocity of 100 volumes of gas per volume of bed per hour.

While the invention has been described with reference to specific features and preferred embodiments thereof, it will be apparent that numerous variations, modifications, and embodiments are possible, and all such variations, modifications, and embodiments are therefore to be regarded as being within the spirit and scope of the invention.

What is claimed is:

1. A scavenger having utility for purifying inert gas mixtures to remove Lewis acid and oxidant impurities therefrom, and characterized by a water and oxygen removal capacity exceeding 5 liters of gaseous water and/or oxygen per liter of bed of the scavenger, said scavenger comprising:

(a) an inert inorganic support having a surface area of from about 30 to about 1000 square meters per gram, and thermally stable up to at least about 300° C.; and (b) an active scavenging species, present on said support at a concentration of from about 1 mole to about 5 moles per liter of support, and formed by deposition on the support of an organometallic precursor and pyrolysis thereof at a selected elevated temperature on said support, said organometallic precursor and said selected elevated temperature being selected from those of the group consisting of:

(i) said organometallic precursor being an organometal compound of the formula MR, wherein M is a metal from Group IA and R is alkyl, and said selected elevated temperature being in the range of from about 150° C. to about 210° C.;

(ii) said organometallic precursor being an organometallic metal compound of the formula $M(R)_2$, wherein M is a metal from Group IIA and R is alkyl, and said selected elevated temperature being in the range from about 150° C. to about 210° C.; and (iii) said organometallic precursor being an organometallic metal compound of the formula $M(R)_3$, wherein M is a metal from Group IIIA and R is alkyl, and said selected elevated temperature being in the range of from about 150° to about 250° C.

2. A scavenger according to claim 1, wherein said support is formed of a material selected from the group consisting of: alumina; silica; aluminosilicates; kieselguhr; carbon; and mixtures, alloys, and composites thereof.

3. A scavenger according to claim 1, comprising an alumina support.

4. A scavenger according to claim 1, wherein said organometallic precursor is an alkyl metal compound comprising a metal selected from the group consisting of lithium, sodium, and potassium.

5. A scavenger according to claim 1, wherein said organometallic precursor is an alkyl metal compound comprising a metal selected from the group consisting of magnesium, barium, and clacium.

6. A scavenger according to claim 1, wherein said organometallic precursor is an alkyl metal compound comprising aluminum as the metal constituent thereof.

7. A scavenger according to claim 1, characterized by a water scavenging capacity of from about 15 to about 30 liters gaseous water per liter of a bed of said scavenger.

8. A scavenger according to claim 1, wherein said organometallic precursor is butyllithium.

9. A scavenger according to claim 1, wherein said organometallic precursor is dibutylmagnesium.

10. A scavenger according to claim 1, wherein said organometallic precusor is selected from the group consisting of trimethylaluminum, triethylaluminum, and diisobutylaluminum hydride.

11. A scavenger according to claim 1, characterized by a scavenging capacity of from about 20 to about 30 liters gaseous water per liter of a bed of said scavenger.

12. A method of making a scavenger having utility for purifying inert gas mixtures to remove Lewis acids and oxidant impurities therefrom, and characterized by a water and oxygen removal capacity exceeding 5 liters of gaseous water and/or oxygen per liter of bed of the scavenger, comprising the steps of:

(a) providing an inert inorganic support having a surface area in the range of from about 30 to about 1000 square meters per gram, and thermally stable up to at least about 300° C.;

(b) depositing on said inorganic support, at a concentration from about 1 mole/liter to about 5 moles/liter of support, an organometallic precursor selected from the group consisting of:

(i) an organometal compound of the formula MR, wherein M is a metal from Group IA and R is alkyl;

(ii) an organometal compound of the formula $M(R)_2$, wherein M is a metal from Group IIA and R is alkyl; and (iii) an organometal compound of the formula $M(R)_3$, wherein M is a metal from Group IIIA and R is alkyl; and (c) pyrolyzing the organometallic precursor on the support, at a temperature of from about 150° C. to about 210° C. for organometallic precursors (b)(i) and (b)(ii), and from about 150° C. to about 250° C. for organometallic precursor (b)(iii).

13. A scavenger according to claim 1, characterized by a water and oxygen removal capacity exceeding 10 liters of gaseous water and/or oxygen per liter of bed of the scavenger.

14. A scavenger having utility for purifying inert gas mixtures to remove Lewis acid and oxidant impurities therefrom and characterized by a water and oxygen removal capacity exceeding 5 liters of gaseous water and/or oxygen per liter of bed of the scavenger, said scavenger comprising:

(a) an inert inorganic support having a surface area of from about 30 to about 1000 square meters per gram, and thermally stable up to at least about 300° C.; and (b) an active scavenging species, present on said support at a concentration of from about 1 mole to about 5 moles per liter of support, and formed by deposition on the support of an organometallic precursor compound of the formula $M(R)_2$, wherein M is a metal from Group IIIA and R is alkyl, and pyrolysis thereof on said support at elevated temperature in the range from about 150° C. to about 210° C.

15. A scavenger having utility for purifying inert gas mixtures to remove Lewis acid and oxidant impurities therefrom, said scavenger comprising:

(a) an inert inorganic support having a surface area of from about 30 to about 1000 square meters per gram, and thermally stable up to at least about 300° C.; and (b) an active scavenging species, present on said support at a concentration of from about 1 mole to about 5 moles per liter of support, and formed by deposition on the support of an organometallic precursor and pyrolysis thereof at selected elevated temperature on said support, said organometallic precursor and said selected elevated temperature being selected from those of the group consisting of:

(i) said organometallic precursor being an organometallic metal compound of the formula $M(R)_2$, wherein M is a metal from Group IIA and R is alkyl, and said selected elevated temperature being in the range from about 150° C. to about 210° C.; and (ii) said organometallic precursor being an organometal compound of the formula $M(R)_3$, wherein M is a metal from Group IIIA and R is alkyl, and said selected elevated temperature being in the range from about 150° C. to about 250° C.;

wherein the scavenger is devoid of metallated aromatic functional organic groups.

16. A scavenger having utility for purifying inert gas mixtures to remove Lewis acid and oxidant impurities therefrom, scavenger comprising:
(a) an inert inorganic support having a surface area of from about 30 to about 1000 square meters per gram, and thermally stable up to at least about 300° C.; and
(b) an active scavenging species, present on said support at a concentration of from about 1 mole to about 5 moles per liter of support, and formed by deposition on the support of an organometal compound of the formula MR, wherein M is a metal from Group IIA and R is alkyl, and pyrolysis thereof on said support at elevated temperature in the range of from about 150° C. to about 210° C.;

wherein the scavenger is devoid of metallated aromatic functional organic groups.

* * * * *